United States Patent
Akaba et al.

(10) Patent No.: US 12,534,133 B2
(45) Date of Patent: Jan. 27, 2026

(54) REAR PART STRUCTURE OF VEHICLE BODY

(71) Applicant: Honda Motor Co., Ltd., Tokyo (JP)

(72) Inventors: Yuya Akaba, Tokyo (JP); Shungo Chino, Tokyo (JP); Takafumi Takayama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 413 days.

(21) Appl. No.: 18/184,662

(22) Filed: Mar. 16, 2023

(65) Prior Publication Data
US 2023/0311995 A1 Oct. 5, 2023

(30) Foreign Application Priority Data
Mar. 31, 2022 (JP) .................. 2022-058954

(51) Int. Cl.
*B62D 21/11* (2006.01)
*B60G 7/02* (2006.01)
(Continued)

(52) U.S. Cl.
CPC ............... *B62D 21/11* (2013.01); *B60G 7/02* (2013.01); *B62D 21/03* (2013.01); *B62D 21/157* (2013.01);
(Continued)

(58) Field of Classification Search
CPC .......... B60G 7/02; B62D 21/03; B62D 21/11; B62D 21/157; B62D 25/025; B62D 25/08;
(Continued)

(56) References Cited

U.S. PATENT DOCUMENTS

| 2006/0087107 A1* | 4/2006 | Li ..................... B62D 25/025 |
| | | 280/784 |
| 2013/0088045 A1* | 4/2013 | Charbonneau ..... B62D 25/2036 |
| | | 296/187.12 |

(Continued)

FOREIGN PATENT DOCUMENTS

| CN | 201842141 | 5/2011 |
| CN | 105313808 | 2/2016 |

(Continued)

OTHER PUBLICATIONS

"First Office Action of China Counterpart Application", issued on Nov. 18, 2025, with English translation thereof, p. 1-p. 15.

*Primary Examiner* — Lori Lyjak
(74) *Attorney, Agent, or Firm* — JCIPRNET

(57) ABSTRACT

A rear part structure of a vehicle body includes: a rear side frame, extending in a front-rear direction of the vehicle body outside a floor of a rear part of the vehicle body in a vehicle width direction; a front cross member, connected to a first connection part of the rear side frame and extending inward in the vehicle width direction; a rear cross member, connected to the rear side frame by a second connection part positioned on a rear side of the first connection part and extending inward in the vehicle width direction; an arm attachment part, provided on the rear side frame and connecting a trailing arm; and a reinforcing member, extending in the vehicle width direction within a section of the rear side frame. The reinforcing member is positioned between the first connection part and the second connection part in the front-rear direction of the vehicle body.

9 Claims, 6 Drawing Sheets

(51) Int. Cl.
*B62D 21/03* (2006.01)
*B62D 21/15* (2006.01)
*B62D 25/02* (2006.01)
*B62D 25/16* (2006.01)
*B62D 27/02* (2006.01)

(52) U.S. Cl.
CPC ........... *B62D 25/025* (2013.01); *B62D 25/16* (2013.01); *B62D 27/02* (2013.01)

(58) Field of Classification Search
CPC  B62D 25/16; B62D 25/2027; B62D 25/2036; B62D 27/02
See application file for complete search history.

(56) References Cited

U.S. PATENT DOCUMENTS

| | | | | |
|---|---|---|---|---|
| 2018/0244318 | A1* | 8/2018 | Kiyoshita | .............. B62D 25/04 |
| 2021/0070371 | A1 | 3/2021 | Ebisumoto et al. | |

FOREIGN PATENT DOCUMENTS

| | | | | |
|---|---|---|---|---|
| CN | 112477998 | | 3/2021 | |
| CN | 113200090 | | 8/2021 | |
| EP | 2230156 | A1 * | 9/2010 | .............. B60N 2/005 |
| FR | 3082173 | A1 * | 12/2019 | ......... B62D 25/2036 |
| JP | 2006062442 | | 3/2006 | |
| JP | 2014051115 | | 3/2014 | |
| JP | 2014051116 | | 3/2014 | |

* cited by examiner

A enlarged

View along B-B

REAR PART STRUCTURE OF VEHICLE BODY

CROSS-REFERENCE TO RELATED APPLICATIONS

This application claims the priority benefit of Japan Application No. 2022-058954, filed on Mar. 31, 2022. The entirety of the above-mentioned patent application is hereby incorporated by reference herein and made a part of this specification.

BACKGROUND

Technical Field

The disclosure relates to a rear part structure of a vehicle body.

Related Art

As a rear part structure of a vehicle body, for example, Patent Document 1 has disclosed the following configuration. By provision of a load transmission member in a position behind a rear door opening and in front of a wheelhouse, a load due to impact at the time of a vehicle collision that is input to a rear door may be transmitted to a vehicle body side by the load transmission member, and the rear door may be prevented from entering the interior of the vehicle due to displacement.

[Patent Document 1] Japanese Patent Laid-open No. 2014-51115

However, in recent years, there has been an increasing number of vehicles equipped with large batteries, and the weight of the vehicles has been increased by the mounting of the batteries. Accordingly, a load input to a vehicle body due to a collision (so-called side collision) from a side of the vehicle has also been increased. In the case where the load input to the vehicle body at the time of a side collision of the vehicle is excessively large, in the conventional structure described in Patent Document 1, because of an increase in the load input to a rear side frame, the rear side frame may be deformed and its entry into the interior of the vehicle may not be able to be completely prevented.

SUMMARY

A rear part structure of a vehicle body according to the disclosure includes: a rear side frame, extending in a front-rear direction of the vehicle body on an outside of a floor of a rear part of the vehicle body in a vehicle width direction; a front cross member, connected to a first connection part of the rear side frame and extending inward in the vehicle width direction; a rear cross member, connected to the rear side frame by a second connection part positioned on a rear side of the first connection part and extending inward in the vehicle width direction; an arm attachment part, provided on the rear side frame and connecting a trailing arm; and a reinforcing member, extending in the vehicle width direction within a section of the rear side frame. The reinforcing member is arranged in a position between the first connection part and the second connection part in the front-rear direction of the vehicle body.

DESCRIPTION OF THE EMBODIMENTS

Figure 1:
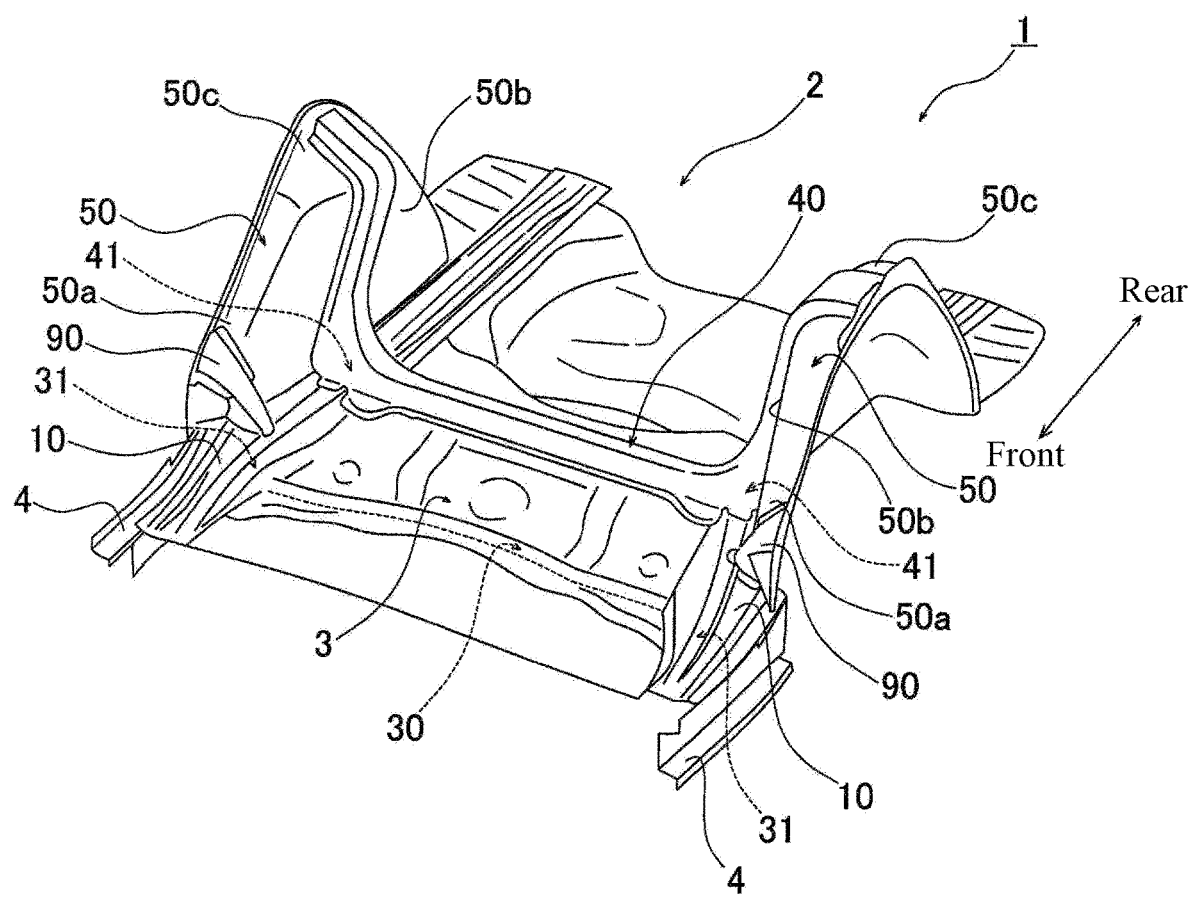
FIG. 1 is a schematic perspective view from above of a floor of a rear part of a vehicle body to which a rear part structure of a vehicle body according to an embodiment of the disclosure is applied.

In the disclosure, a rear part structure of a vehicle body is provided in which deformation of a rear part of the vehicle body at the time of a side collision can be effectively suppressed by effectively improving resistance of a rear side frame to a load input due to a vehicle collision by a simple configuration. Thereby, while the safety of transportation by vehicle is improved, deterioration of smoothness of transportation is suppressed.

A rear part structure of a vehicle body according to the disclosure includes: a rear side frame (10), extending in a front-rear direction of the vehicle body (1) on an outside of a floor (2) of a rear part of the vehicle body (1) in a vehicle width direction; a front cross member (30), connected to a first connection part (31) of the rear side frame (10) and extending inward in the vehicle width direction; a rear cross member (40), connected to the rear side frame (10) by a second connection part (41) positioned on a rear side of the first connection part (31) and extending inward in the vehicle width direction; an arm attachment part (17), provided on the rear side frame (10) and connecting a trailing arm; and a reinforcing member (60), extending in the vehicle width direction within a section of the rear side frame (10). The reinforcing member (60) is arranged in a position between the first connection part (31) and the second connection part (41) in the front-rear direction of the vehicle body (1).

According to the rear part structure of a vehicle body according to the disclosure, the reinforcing member in the rear side frame is arranged between the first connection part connecting the front cross member and the second connection part connecting the rear cross member in the rear side frame, so when a load is input to the rear side frame due to a collision from a side (side collision) to the rear part of the vehicle body, the load due to the side collision is transmitted to the front cross member and the rear cross member via the reinforcing member. Therefore, the rigidity of the rear part of the vehicle body can be improved, and deformation (deformation inward in the vehicle width direction (toward the interior side)) of the rear part (floor) of the vehicle body at the time of a side collision can be effectively suppressed.

Further, in the disclosure described above, the rear part structure of a vehicle body may further include: a wheelhouse (50), arranged outside the rear side frame (10) in the vehicle width direction; and a wheelhouse gusset (90), in which the wheelhouse (50) and the rear side frame (10) are connected. The wheelhouse gusset (90) may be connected to a third connection part (91) provided on an upper surface of the rear side frame (10), and the reinforcing member (60) may be provided in a position side by side with the third connection part (91) in an up-down direction within the section of the rear side frame (10).

According to this configuration, the reinforcing member is provided in a position side by side with the third connection part formed by connecting the wheelhouse gusset in the rear side frame in the up-down direction, so the load of a side collision input to the wheelhouse is transmitted to the front cross member and the rear cross member via the reinforcing member. Therefore, the rigidity of the rear part of the vehicle body can be further improved, and deformation (deformation inward in the vehicle width direction (toward the interior side)) of the rear part (floor) of the vehicle body at the time of a side collision can be more effectively suppressed.

Further, in the disclosure described above, the rear part structure of a vehicle body may further include: a first partition member (70), provided in a position on a front side of the reinforcing member (60) within the section of the rear side frame (10). The first partition member (70) may be arranged in a position side by side with the first connection part (31) in the vehicle width direction and be joined to the front cross member (30) via the rear side frame (10).

According to this configuration, the first partition member arranged in front of the reinforcing member is arranged in a position side by side with the first connection part to which the front cross member is connected in the vehicle width direction, so the load of a side collision is transmitted to the front cross member via the first partition member. Therefore, the rigidity of the rear part of the vehicle body can be further improved, and deformation (deformation inward in the vehicle width direction (toward the interior side)) of the rear part (floor) of the vehicle body at the time of a side collision can be more effectively suppressed. In addition, since the load of a side collision is distributed to the reinforcing member and the first partition member, deformation of the rear side frame can be more effectively suppressed.

Further, in the disclosure described above, the arm attachment part (17) may have a convex part (17*a*) that becomes convex upward within the section of the rear side frame (10), and the reinforcing member (60) may extend in the vehicle width direction above the convex part (17*a*) and be joined to the rear side frame (10) via a collar member (66) on both sides of the convex part (17*a*) in the vehicle width direction.

According to this configuration, by providing the reinforcing member above the convex part of the trailing arm attachment part, the load due to a side collision input to the convex part is transmitted to the front cross member and the rear cross member via the reinforcing member. Therefore, it is possible to suppress deformation of the convex part, which is likely to be deformed at the time of a side collision, that is, deformation of the rear side frame. Moreover, since the load input from the trailing arm can be supported by the reinforcing member, the supporting rigidity of the trailing arm can also be improved.

Further, in the disclosure described above, the collar member (66) may be joined to the reinforcing member (60) by projection welding.

According to this configuration, the collar member is joined to the reinforcing member by projection welding, so it is possible to effectively suppress the occurrence of rust at joints where rust may occur in normal MIG welding, and it is possible to suppress the deterioration of load transmission performance due to aged deterioration.

Further, in the disclosure described above, the rear part structure of a vehicle body may further include: a side sill (4), arranged on the outside in the vehicle width direction with respect to the rear side frame (10) and extending in the front-rear direction of the vehicle body (1). At least a portion of an outer wall (12) of the rear side frame (10) in the vehicle width direction may be formed by the side sill (4), and the reinforcing member (60) may have an outer end in the vehicle width direction joined to the side sill (4) and an upper end joined to an upper wall (15) of the rear side frame (10).

According to this configuration, the reinforcing member is joined to the side sill and the upper wall of the rear side frame, so the load due to a side collision can be easily transmitted to the reinforcing member, and the load input to the reinforcing member can be distributed to the rear side frame. As a result, the rigidity of the rear part of the vehicle body can be further improved, and deformation (deformation inward in the vehicle width direction (toward the interior side)) of the rear part (floor) of the vehicle body at the time of a side collision can be more effectively suppressed.

Further, in the disclosure described above, at least a portion of an outer wall (12) of the rear side frame (10) in the vehicle width direction may be formed by a curved part that is a portion of the wheelhouse (50). The rear part structure of a vehicle body may include a second partition member (80) provided in a position on a rear side of the reinforcing member (60) within the section of the rear side frame (10), and the second partition member (80) may extend from the curved part to be inclined to a front side of the vehicle body and inward in the vehicle width direction, and have an inner end in the vehicle width direction joined to the reinforcing member (60).

According to this configuration, the second partition member extends from the curved part that forms a portion of the wheelhouse to be inclined to the front side of the vehicle body and inward in the vehicle width direction, and the inner end in the vehicle width direction is joined to the reinforcing member, so the load of a side collision input to the wheelhouse is transmitted to the front cross member and the rear cross member via the reinforcing member. Therefore, the rigidity of the rear part of the vehicle body can be further improved, and deformation (deformation inward in the vehicle width direction (toward the interior side)) of the rear part (floor) of the vehicle body at the time of a side collision can be more effectively suppressed.

Further, in the disclosure described above, the rear part structure of a vehicle body may further include: an intermediate member (95), joined to the reinforcing member (60) and an upper side of the second partition member (80) within the section of the rear side frame (10), and the intermediate member (95) and the wheelhouse gusset (90) may be arranged in positions side by side in an up-down direction.

According to this configuration, by providing the intermediate member joined to the reinforcing member and the upper side of the second partition member, the load due to a side collision input to the wheelhouse can be efficiently transmitted and distributed to the reinforcing member and the second partition member. Therefore, since the rigidity of the rear side frame can be improved, deformation of the rear side frame can be effectively suppressed.

Further, in the disclosure described above, the rear side frame (10) may have a portion on a rear side of the reinforcing member (60) inclined toward the rear cross member (40) on an inner side in the vehicle width direction, and the rear cross member (40) may be connected to the wheelhouse (50).

According to this configuration, since the rear side frame is inclined toward the rear cross member on the inside in the vehicle width direction, it is easy to transmit the load input to the reinforcing member to the rear cross member. Therefore, since the rigidity of the rear side frame can be improved, deformation of the rear side frame can be effectively suppressed. In addition, as the rear cross member is connected to the wheelhouse, it is possible to improve resistance to the load transmitted to the rear cross member, so the rigidity of the rear side frame can be further improved.

The above numerals in parentheses indicate reference numerals in the drawings of corresponding components in the embodiments described later for reference.

According to a rear part structure of a vehicle body according to the disclosure, a rear part structure of a vehicle body is provided in which deformation of a rear part of the vehicle body at the time of a side collision can be effectively suppressed by effectively improving resistance of a rear side frame to a load input due to a vehicle collision by a simple configuration. Thereby, while the safety of transportation by vehicle is improved, deterioration of smoothness of transportation can be suppressed.

An embodiment of the disclosure will be described below in detail with reference to the accompanying drawings. In the following description, the term "front" or "rear" as mentioned refers to a front side being a forward direction or a rear side being a rearward direction of a vehicle body (vehicle) described later. The terms "left" and "right" as mentioned respectively refer to the left and right in a vehicle width direction when the vehicle body (vehicle) is facing forward (front side). The terms "up" and "down" as mentioned refer to an up-down direction (vertical up-down direction) of the vehicle body (vehicle).

Figure 2:
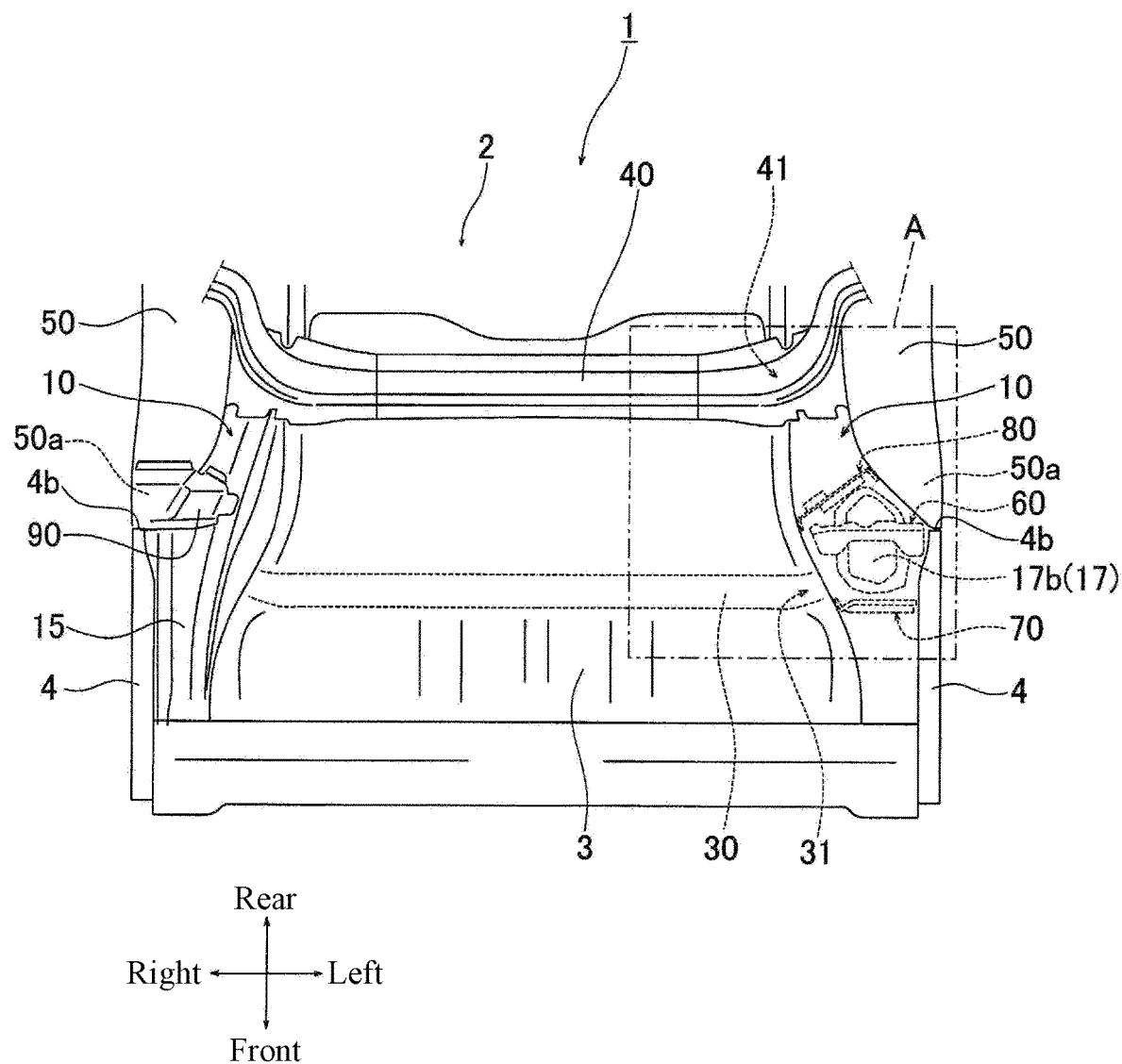
FIG. 2 is a schematic plan view showing a floor of a rear part of a vehicle body.

FIG. 1 and FIG. 2 illustrate a floor of a rear part of a vehicle body to which a rear part structure of a vehicle body according to an embodiment of the disclosure is applied, FIG. 1 is a schematic perspective view from above of the floor, and FIG. 2 is a schematic plan view showing the floor. As shown in these drawings, a vehicle body 1 of this embodiment includes: a floor 2, provided in a rear part of the vehicle body 1; a pair of rear side frames 10, 10, extending in a front-rear direction of the vehicle body 1 on an outside of the floor 2 in a vehicle width direction; a front cross member 30, connected between the pair of rear side frames 10, 10 and extending inward in the vehicle width direction; a rear cross member 40, connected between the pair of rear side frames 10, 10 in a position on the rear side of the front cross member 30 and extending inward in the vehicle width direction; and a rear floor panel 3, constituting a bottom surface of the floor 2 between the pair of rear side frames 10, 10.

Figure 3:
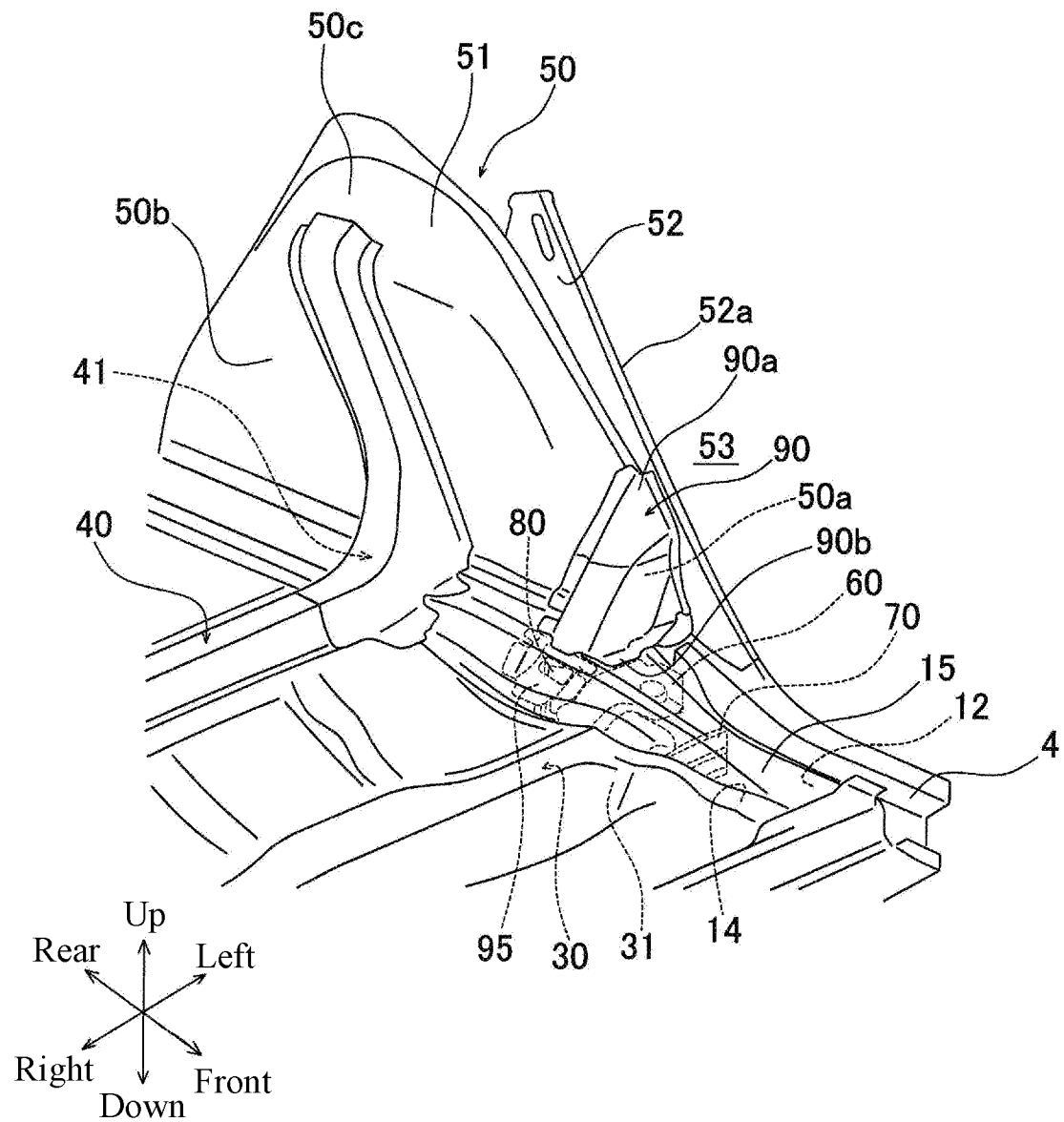
FIG. 3 is a perspective view showing a rear wheelhouse and a rear side frame.

Rear wheelhouses 50, 50 housing rear wheels (rear tires) (not shown) are respectively provided outside the pair of rear side frames 10, 10 in the vehicle width direction. FIG. 3 is a perspective view (perspective view from the front and inside in the vehicle width direction) showing a rear wheelhouse and a rear side frame. The rear wheelhouse 50 includes: a bulge 51, having an outer shape of a curved surface covering an outer shape of the rear tire, and bulging inward in the vehicle width direction; and a flange 52 of a plate shape, having a surface extending in the up-down direction outside the bulge 51. An upper end side 52a of the flange 52 constitutes a lower end side of a rear door opening 53 provided on a side of the vehicle body 1, and is inclined along a front side portion of the bulge 51 so as to gradually decrease in height from the rear toward the front.

In a front connection part (first connection part) 31 provided in a position on the front side of a front end 50a of the rear wheelhouse 50 in the rear side frame 10, the front cross member 30 is connected to a side surface (inner surface) of an inner wall 13 of the rear side frame 10, and connects the left and right rear side frames 10, 10 in the vehicle width direction. In a rear connection part (second connection part) 41 provided in a position inside the rear wheelhouse 50 in the rear side frame 10, the rear cross member 40 is connected to a side surface (inner surface) of the inner wall 13 of the rear side frame 10, extends upward from the rear connection part 41 along an inner surface 50b (inner wall of the bulge 51) of the rear wheelhouse 50, and has both ends respectively reaching upper ends 50c, 50c of the rear wheelhouses 50, 50. Accordingly, the rear cross member 40 connects the left and right rear side frames 10, 10 together, and also connects the left and right rear wheelhouses 50, 50 together. The rear side frame 10 and the rear wheelhouse 50 adjacent in the vehicle width direction are also connected by the rear cross member 40. The front connection part 31 is located on the front side of the rear connection part 41 in the front-rear direction of the vehicle body 1.

Figure 4:
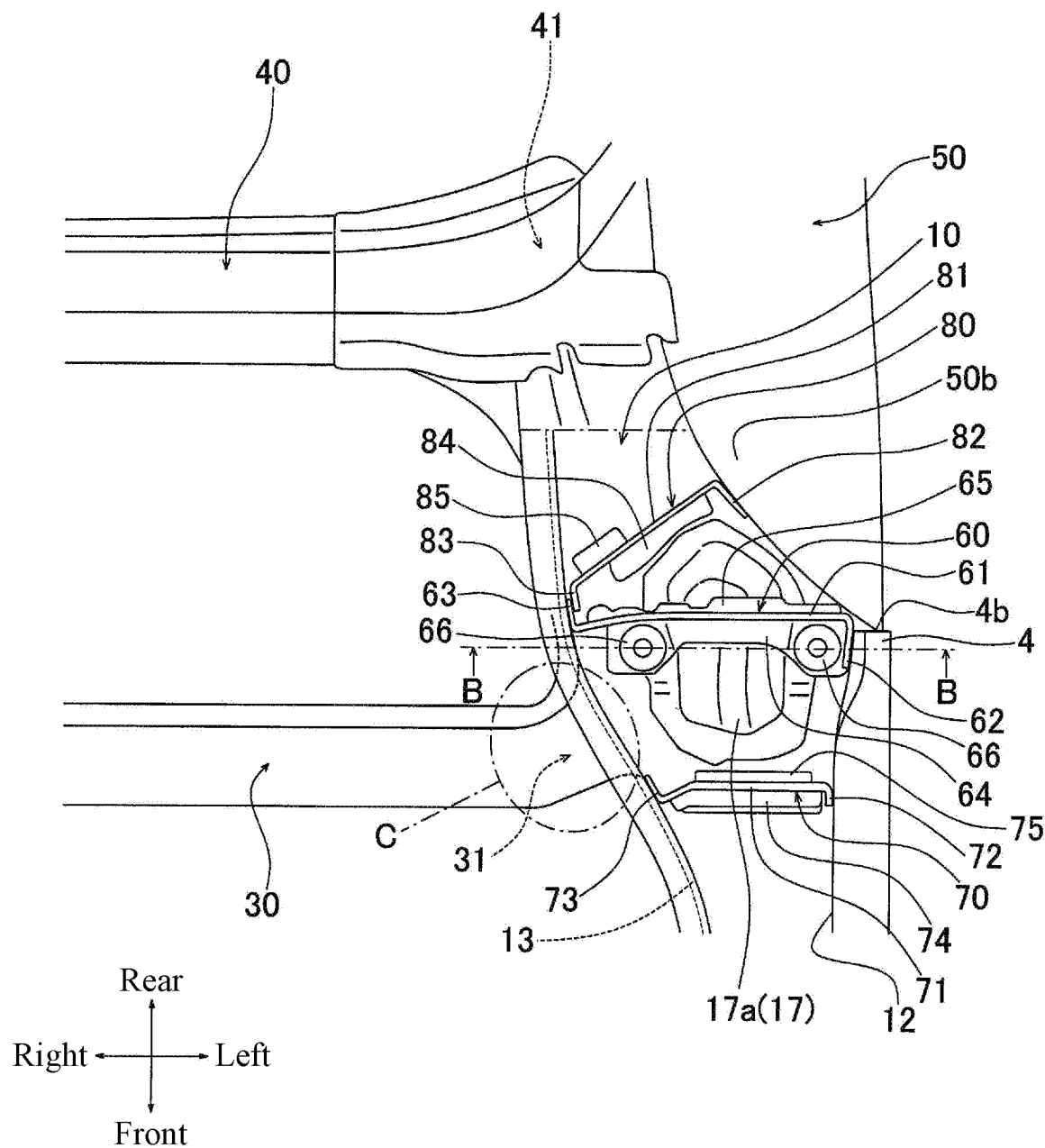
FIG. 4 is a plan view showing a rear side frame and a portion of its surroundings, and is a partially enlarged view of a portion A of FIG. 2.
Figure 5:
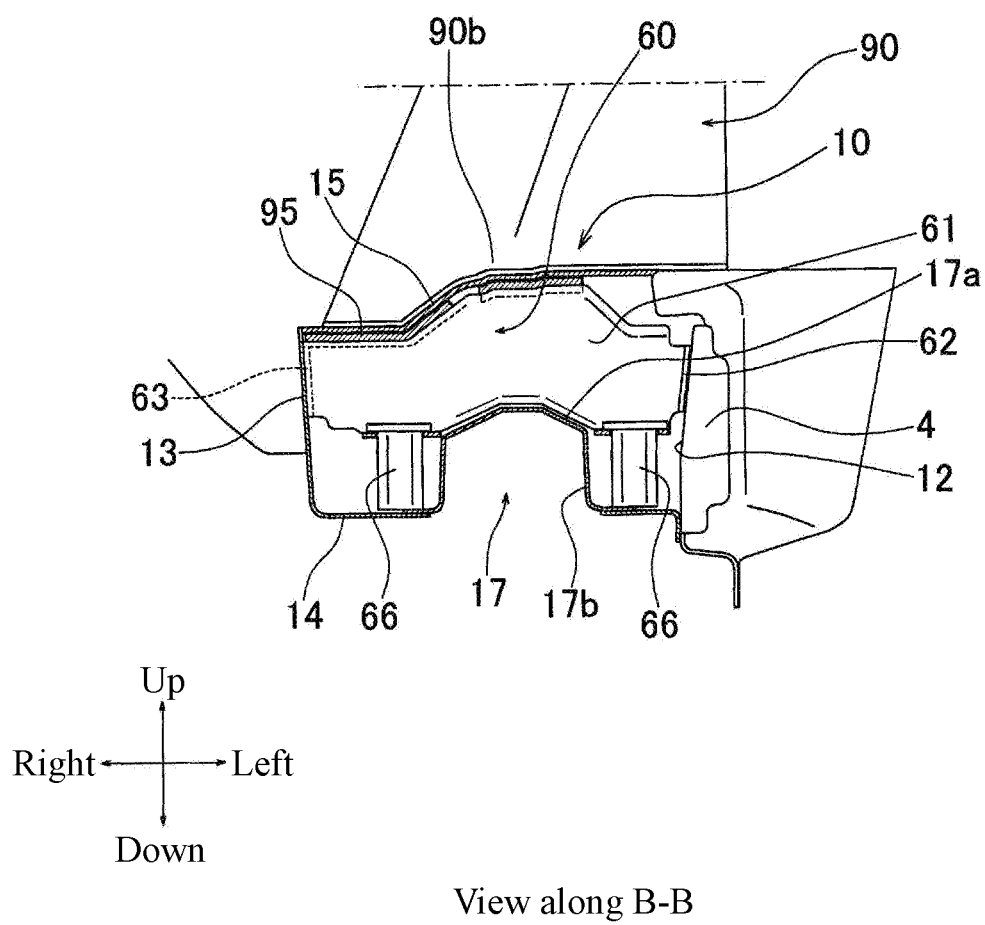
FIG. 5 illustrates a section of a rear side frame, and illustrates a section taken along line B-B of FIG. 4.
Figure 6:
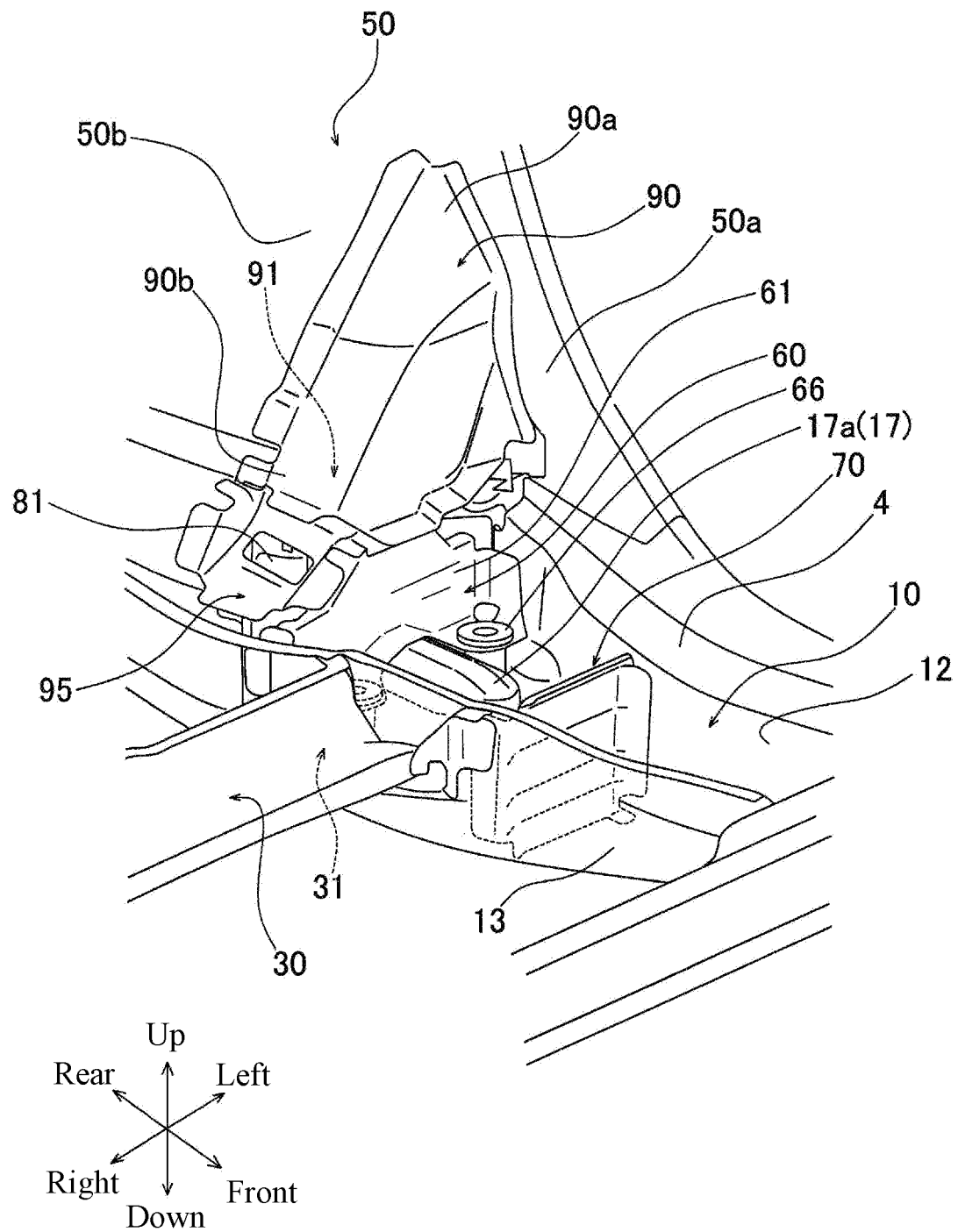
FIG. 6 is a perspective view showing the inside of a rear side frame and a front end of a rear wheelhouse.

FIG. 4 is a plan view showing a rear side frame and a portion of its surroundings, and is a partially enlarged view of a portion A of FIG. 2. FIG. 5 illustrates a section of a rear side frame, and illustrates a section taken along line B-B of FIG. 4. FIG. 6 is a perspective view showing the inside of a rear side frame and a front end of a rear wheelhouse.

Since a pair of left and right rear side frames 10, 10 and a pair of left and right rear wheelhouses 50, 50 have symmetrical shapes and configurations, in the following description, the rear side frame 10 and the rear wheelhouse 50 on one side will be described. In each of the above drawings, some members may be omitted for convenience of description. In particular, in FIG. 4, illustration of the rear floor panel 3 and an upper wall (upper member) 15 of the rear side frame 10 and a wheelhouse gusset 90 that are to be described later is omitted; in FIG. 6, illustration of the rear floor panel 3 and the upper wall 15 is omitted.

As shown in FIG. 3 to FIG. 5, the rear side frame 10 includes: an outer wall 12, constituting an outer wall in the vehicle width direction; an inner wall 13, constituting an inner wall in the vehicle width direction; a bottom wall 14, constituting a bottom part (bottom surface); and the upper wall (upper member) 15, constituting an upper part (upper surface). A section of the rear side frame 10 in a longitudinal direction as viewed in the front-rear direction is configured as a closed section of a substantially rectangular shape (substantially square shape). The outer wall 12 of the rear side frame 10 located on the rear side of the front end 50a of the rear wheelhouse 50 is composed of a curved part being the inner surface 50b (inner wall of the bulge 51) of the rear wheelhouse 50. The outer wall 12 of the rear side frame 10 located on the front side of the front end 50a of the rear wheelhouse 50 is composed of a side sill 4. The side sill 4 is an elongated member extending in the front-rear direction on both sides of the vehicle body 1 in front of the rear wheelhouse 50, and a rear end 4b of the side sill 4 is arranged in a position facing the front end 50a of the rear wheelhouse 50. Accordingly, the rear end 4b of the side sill 4 and its vicinity extend in the front-rear direction outside the rear side frame 10.

As shown in FIG. 4, while the outer wall 12 of the rear side frame 10 on the front side of the front end 50a of the rear wheelhouse 50 (rear end 4b of the side sill 4) extends substantially linearly along the front-rear direction as a portion of the side sill 4, the outer wall 12 of the rear side frame 10 on the rear side of the front end 50a of the rear wheelhouse 50 is gradually inclined inward in the vehicle width direction as going rearward along the inner surface 50b of the rear wheelhouse 50. On the other hand, the inner wall 13 of the rear side frame 10 is gradually inclined inward in the vehicle width direction from the front side toward the rear side from a position on the front side of the front connection part 31 to which the front cross member 30 is connected to the rear connection part 41 to which the rear cross member 40 is connected. According to the above, the rear cross member 40 is formed so that a dimension (width dimension of section) in the vehicle width direction gradually increases from the front side toward the rear side from the front connection part 31 to the rear connection part 41.

As shown in FIG. 4 and FIG. 5, the rear side frame 10 is provided with an arm attachment part 17 for attaching a trailing arm (not shown) being a component of a rear suspension. The arm attachment part 17 has a convex part 17a provided on the bottom wall (bottom surface) 14 of the rear side frame 10 and bulging (protruding) upward, and a recess 17b recessed upward is formed on a lower surface side (lower surface of the rear side frame 10) of the arm attachment part 17. A component of the trailing arm is connected into the recess 17b. Accordingly, the arm attachment part 17 is formed in the shape of a protrusion that becomes convex (protrudes) upward within a section of the rear side frame 10. The arm attachment part 17 is arranged in a position side by side with the front end 50a of the rear wheelhouse 50 and the rear end 4b of the side sill 4 in the vehicle width direction in the rear side frame 10, and is arranged in a position side by side with the front connection part 31 that connects the front cross member 30.

A reinforcing member 60 that reinforces the arm attachment part 17 is provided within the section of the rear side frame 10. The reinforcing member 60 is a plate-like member made of metal and extending in the vehicle width direction within the section of the rear side frame 10, and includes: a main body 61 of a substantially flat plate shape, extending from the outer wall 12 to the inner wall 13 of the rear side frame 10 in the vehicle width direction; and joining pieces 62 to 65 of a tongue shape, respectively connected to left and right end sides and lower and upper end sides of the main body 61. As shown in FIG. 5, the reinforcing member 60 is arranged in a position right above the arm attachment part 17 within the section of the rear side frame 10 and is arranged across the arm attachment part 17 in the vehicle width direction (left-right direction). The lower end side of the main body 61 of the reinforcing member 60 abuts against an upper surface of the arm attachment part 17 (convex part 17a).

The joining piece 63 on the inside of the reinforcing member 60 is joined by welding to the inner wall 13 of the rear side frame 10 and a joining piece 83 on the inside of a rear partition member 80 described later. The joining piece 62 on the outside of the reinforcing member 60 is joined by welding to an inner surface of the side sill 4 being the outer wall 12 of the rear side frame 10. The joining piece 65 on the upper side of the reinforcing member 60 is joined by adhesion with an adhesive to an intermediate member 95 described later and the upper wall (upper member) 15 of the rear side frame 10. On the other hand, the joining piece 64 on the lower side of the reinforcing member 60 is connected to the bottom wall 14 of the rear side frame 10 via a collar member 66 on each of both sides (left and right sides) of the arm attachment part 17 in the vehicle width direction. The collar member 66 is an elongated tubular member whose longitudinal direction extends in the up-down direction. An upper end of the collar member 66 is joined by welding to the joining piece 64 on the lower side of the reinforcing member 60, and a lower end of the collar member 66 is joined by welding to the bottom wall 14 of the rear side frame 10. The welding between the upper end of the collar member 66 and the joining piece 64 of the reinforcing member 60 is desirably projection welding.

In this way, the reinforcing member 60 provided within the section of the rear side frame 10 has an outer end in the vehicle width direction joined (welded) to the side sill 4 and has upper end joined (by adhesion) to the upper wall (upper member) 15 of the rear side frame 10.

The reinforcing member 60 is arranged in a position between the front connection part 31 to which the front cross member 30 is connected and the rear connection part 41 to which the rear cross member 40 is connected in the front-rear direction of the rear side frame 10.

A front partition member (first partition member) 70 is provided in a position on the front side of the reinforcing member 60 and the arm attachment part 17 within the section of the rear side frame 10. The front partition member 70 is a plate-like member made of metal and extending in the vehicle width direction within the section of the rear side frame 10, and includes: a main body 71 of a substantially flat plate shape, extending from the outer wall 12 to the inner wall 13 of the rear side frame 10 in the vehicle width direction; and joining pieces 72 to 75 of a tongue shape, respectively connected to left and right end sides and upper and lower end sides of the main body 71. The front partition member 70 is arranged in a position side by side with the front connection part 31 in the vehicle width direction within the section of the rear side frame 10.

The joining piece 73 on the inside of the front partition member 70 is joined by welding to the inner wall 13 of the rear side frame 10 and an end of the front cross member 30 at the front connection part 31. That is, the front partition member 70 is joined to the front cross member 30 via the inner wall 13 of the rear side frame 10. The joining piece 72 on the outside of the front partition member 70 is joined by welding to the inner surface of the side sill 4 being the outer wall 12 of the rear side frame 10. The joining piece 75 on the upper side of the front partition member 70 is joined by welding to the upper wall (upper member) 15 of the rear side frame 10, and the joining piece 74 on the lower side of the front partition member 70 is joined by welding to the bottom wall 14.

The rear partition member (second partition member) 80 is provided in a position on the rear side of the reinforcing member 60 and the arm attachment part 17 within the section of the rear side frame 10. The rear partition member 80 is a plate-like member made of metal and extending in the vehicle width direction within the section of the rear side frame 10, and extends inclined to the front side of the vehicle body and inward in the vehicle width direction. The rear partition member 80 includes: a main body 81 of a substantially flat plate shape, extending in an inclination direction from the inner surface 50b of the rear wheelhouse 50 (that is, the outer wall 12) to the inner wall 13 of the rear side frame 10 in the vehicle width direction; and joining pieces 82 to 85 of a tongue shape, respectively connected to left and right end sides and upper and lower end sides of the main body 81.

The joining piece 83 on the inside of the rear partition member 80 is joined by welding to the inner wall 13 of the rear side frame 10 and the joining piece 63 on the inside of the reinforcing member 60. That is, an inner end of the rear partition member 80 in the vehicle width direction is joined to the reinforcing member 60. The joining piece 82 on the outside of the rear partition member 80 is joined by welding to the inner surface 50b of the rear wheelhouse 50 being the outer wall 12 of the rear side frame 10. The joining piece 85 on the upper side of the rear partition member 80 is joined by adhesion with an adhesive to the intermediate member 95 described later, and the joining piece 84 on the lower side of the rear partition member 80 is joined by welding to the bottom wall 14.

As shown in FIG. 2 and FIG. 6, the wheelhouse gusset 90 is provided extending from the front end 50*a* of the rear wheelhouse 50 toward the upper wall 15 (upper surface) of the rear side frame 10 and connecting the front end 50*a* and the upper wall 15. The wheelhouse gusset 90 is a metal member provided extending inward and downward in the vehicle width direction from the front end 50*a* of the rear wheelhouse 50 so as to cover the upper wall 15 of the rear side frame 10. An upper end 90*a* of the wheelhouse gusset 90 is joined by welding to the front end 50*a* of the rear wheelhouse 50 (bulge 51) and the vicinity of the upper end side 52*a* in the flange 52. In FIG. 2, only one of the left and right wheelhouse gussets 90, 90 is shown.

The intermediate member 95 is provided to be joined (by adhesion) to the reinforcing member 60 and the upper side of the rear partition member 80 within the section of the rear side frame 10. A lower end 90*b* of the wheelhouse gusset 90 is joined to the intermediate member 95 via the upper wall (upper member) 15 of the rear side frame 10. Accordingly, the wheelhouse gusset 90 is joined to the rear partition member 80 and the reinforcing member 60 within the section of the rear side frame 10 via the intermediate member 95. Accordingly, the wheelhouse gusset 90 and the intermediate member 95 are joined by welding via the upper wall (upper member) 15 being a cover of the rear side frame 10.

The intermediate member 95 is a plate-like member made of metal, and has a section formed in an upwardly open recess shape (that is, a downwardly convex substantially U shape) as viewed in the vehicle width direction. The joining piece 85 on the upper side of the rear partition member 80 is joined to a lower surface of the sectional portion of the intermediate member 95. A joining portion between the lower surface of the intermediate member 95 and a joining piece of the rear partition member 80 is joined by adhesion with an adhesive.

The rear partition member 80, the intermediate member 95 and the reinforcing member 60 are arranged in positions right below an upper connection part (third connection part) 91 where the wheelhouse gusset 90 is connected to the rear side frame 10. The rear partition member 80, the intermediate member 95, and the reinforcing member 60 are provided in positions side by side with the lower end 90*b* of the wheelhouse gusset 90 and the upper connection part 91.

As shown in FIG. 4, the front connection part 31 in the rear side frame 10 to which the front cross member 30 is connected is arranged in a position on the front side of the rear partition member 80 in the rear side frame 10. In the front cross member 30 connected to the front connection part 31, an end on the rear side frame 10 side extends toward the rear side (rear partition member 80 side) of the vehicle body 1 (see portion C in FIG. 4). In other words, an end of the front cross member 30 is inclined so as to gradually become closer to the rear side outward in the vehicle width direction, and that portion is obliquely connected to the inner wall 13 of the rear side frame 10. Accordingly, the end on the rear side frame 10 side of the front cross member 30 extends toward the rear side of the vehicle body 1, that is, toward the rear partition member 80.

The rear part structure of a vehicle body according to this embodiment includes: the rear side frame 10, extending in the front-rear direction of the vehicle body 1 on the outside of the floor 2 of the rear part of the vehicle body 1 in the vehicle width direction; the front cross member 30, connected to the front connection part (first connection part) 31 of the rear side frame 10 and extending inward in the vehicle width direction; the rear cross member 40, connected to the rear side frame 10 by the rear connection part (second connection part) 41 positioned on the rear side of the front connection part 31 and extending inward in the vehicle width direction; the arm attachment part 17, provided on the rear side frame 10 and connecting the trailing arm (suspension component); and the reinforcing member 60, extending in the vehicle width direction within the section of the rear side frame 10. The reinforcing member 60 is arranged in a position between the front connection part 31 and the rear connection part 41 in the front-rear direction of the vehicle body 1.

According to the rear part structure of a vehicle body 1 of this embodiment, the reinforcing member 60 in the rear side frame 10 is arranged between the front connection part 31 connecting the front cross member 30 and the rear connection part 41 connecting the rear cross member 40 in the rear side frame 10, so when a load is input to the rear side frame 10 due to a collision from a side (side collision) to the rear part of the vehicle body 1, the load due to the side collision is transmitted to the front cross member 30 and the rear cross member 40 via the reinforcing member 60. Therefore, the rigidity of the rear part of the vehicle body 1 can be improved, and deformation (deformation inward in the vehicle width direction (toward the interior side)) of the rear part (floor 2) of the vehicle body 1 at the time of a side collision can be effectively suppressed.

Further, in this embodiment, the rear part structure of a vehicle body includes: the rear wheelhouse 50, arranged outside the rear side frame 10 in the vehicle width direction; and the wheelhouse gusset 90, in which the rear wheelhouse 50 and the rear side frame 10 are connected. Then, the wheelhouse gusset 90 is connected to the upper connection part (third connection part) 91 provided on the upper wall 15 (upper surface) of the rear side frame 10, and the reinforcing member 60 is provided in a position side by side with the upper connection part 91 in the up-down direction within the section of the rear side frame 10.

According to this configuration, the reinforcing member 60 is provided in a position side by side with the upper connection part 91 formed by connecting the wheelhouse gusset 90 in the rear side frame 10 in the up-down direction, so the load of a side collision input to the rear wheelhouse 50 is transmitted to the front cross member 30 and the rear cross member 40 via the reinforcing member 60. Therefore, the rigidity of the rear part of the vehicle body 1 can be further improved, and deformation (deformation inward in the vehicle width direction (toward the interior side)) of the rear part (floor 2) of the vehicle body 1 at the time of a side collision can be more effectively suppressed.

In addition, in this embodiment, the rear part structure of a vehicle body includes: the front partition member 70, provided in a position on the front side of the reinforcing member 60 within the section of the rear side frame 10. The front partition member 70 is arranged in a position side by side with the front connection part 31 in the vehicle width direction and is joined to the front cross member 30 via the rear side frame 10.

According to this configuration, the front partition member 70 arranged in front of the reinforcing member 60 is arranged in a position side by side with the front connection part 31 to which the front cross member 30 is connected in the vehicle width direction, so the load of a side collision is transmitted to the front cross member 30 via the front partition member 70. Therefore, the rigidity of the rear part of the vehicle body 1 can be further improved, and deformation (deformation inward in the vehicle width direction (toward the interior side)) of the rear part (floor 2) of the vehicle body 1 at the time of a side collision can be more effectively suppressed.

In addition, since the load of a side collision is distributed to the reinforcing member 60 and the front partition member 70, deformation of the rear side frame 10 can be more effectively suppressed.

Further, in this embodiment, the arm attachment part 17 has the convex part 17a that becomes convex upward within the section of the rear side frame 10, and the reinforcing member 60 extends in the vehicle width direction above the convex part 17a and is joined to the rear side frame 10 via the collar member 66 on both sides of the convex part 17a in the vehicle width direction.

According to this configuration, by providing the reinforcing member 60 above the convex part 17a of the arm attachment part 17 for attaching the trailing arm, the load due to a side collision input to the convex part 17a is transmitted to the front cross member 30 and the rear cross member 40 via the reinforcing member 60. Therefore, it is possible to suppress deformation of the convex part 17a, which is likely to be deformed at the time of a side collision, and the rear side frame 10. Moreover, since the load input from the trailing arm can be supported by the reinforcing member 60, the supporting rigidity of the trailing arm can also be improved.

Further, in this embodiment, the collar member 66 is joined to the reinforcing member 60 by projection welding.

According to this configuration, while normal MIG welding may cause rust, the collar member 66 is joined to the reinforcing member 66 by projection welding, so it is possible to effectively suppress the occurrence of rust at joints, and it is possible to suppress the deterioration of load transmission performance due to aged deterioration.

Further, in this embodiment, at least a portion of the outer wall 12 of the rear side frame 10 is formed by the side sill 4, and the reinforcing member 60 has an outer end in the vehicle width direction joined to the side sill 4 and an upper end joined to the upper member (cover of the rear side frame 10) that constitutes the upper wall 15 of the rear side frame 10 by adhesion of an adhesive agent.

According to this configuration, the reinforcing member 60 is joined to the side sill 4 and the upper wall (upper member) 15 of the rear side frame 10, so the load due to a side collision can be easily transmitted to the reinforcing member 60, and the load input to the reinforcing member 60 can be distributed to the rear side frame 10. As a result, the rigidity of the rear part of the vehicle body 1 can be further improved, and deformation (deformation inward in the vehicle width direction (toward the interior side)) of the rear part (floor 2) of the vehicle body 1 at the time of a side collision can be more effectively suppressed.

Further, in this embodiment, at least a portion of the outer wall 12 of the rear side frame 10 in the vehicle width direction is formed by the curved part of the inner surface 50b that is a portion of the rear wheelhouse 50. Then, the rear part structure of a vehicle body includes the rear partition member 80 provided in a position on the rear side of the reinforcing member 60 within the section of the rear side frame 10, and the rear partition member 80 extends from the rear wheelhouse 50 that is the curved part to be inclined to the front side of the vehicle body 1 and inward in the vehicle width direction, and has an inner end in the vehicle width direction joined to the reinforcing member 60.

According to this configuration, the load of a side collision input to the rear wheelhouse 50 is transmitted to the front cross member 30 and the rear cross member 40 via the reinforcing member 60. Therefore, the rigidity of the rear part of the vehicle body 1 can be further improved, and deformation (deformation inward in the vehicle width direction (toward the interior side)) of the rear part (floor 2) of the vehicle body 1 at the time of a side collision can be more effectively suppressed.

Further, in this embodiment, the rear part structure of a vehicle body further includes: the intermediate member 95, joined (adhered) to the reinforcing member 60 and the upper side of the rear partition member 80 within the section of the rear side frame 10. Then, the intermediate member 95 and the wheelhouse gusset 90 are arranged in positions side by side in the up-down direction.

According to this configuration, by providing the intermediate member 95 joined to the reinforcing member 60 and the upper side of the rear partition member 80, the load due to a side collision input to the rear wheelhouse 50 can be efficiently transmitted and distributed to the reinforcing member 60 and the rear partition member 80. Therefore, since the rigidity of the rear side frame 10 can be improved, deformation of the rear side frame 10 can be effectively suppressed.

Further, in this embodiment, the rear side frame 10 has a portion on the rear side of the reinforcing member 60 inclined toward the rear cross member 40 on the inner side in the vehicle width direction, and the rear cross member 40 is connected to the rear wheelhouse 50.

According to this configuration, since the rear side frame 10 is inclined toward the rear cross member 40 on the inside in the vehicle width direction, it is easy to transmit the load input to the reinforcing member 60 to the rear cross member. Therefore, since the rigidity of the rear side frame 10 can be improved, deformation of the rear side frame 10 can be effectively suppressed.

Although an embodiment of the disclosure has been described above, the disclosure is not limited to the above embodiment, and various modifications are possible within the scope of technical ideas described in the claims, specification and drawings.

What is claimed is:

1. A rear part structure of a vehicle body, comprising:
   a rear side frame, extending in a front-rear direction of the vehicle body on an outside of a floor of a rear part of the vehicle body in a vehicle width direction;
   a front cross member, connected to a first connection part of the rear side frame and extending inward in the vehicle width direction;
   a rear cross member, connected to the rear side frame by a second connection part positioned on a rear side of the first connection part and extending inward in the vehicle width direction;
   an arm attachment part, provided on the rear side frame and connecting a trailing arm; and
   a reinforcing member, extending in the vehicle width direction within a section of the rear side frame, wherein
   the reinforcing member is arranged in a position between the first connection part and the second connection part in the front-rear direction of the vehicle body.

2. The rear part structure of a vehicle body according to claim 1, further comprising:
   a wheelhouse, arranged outside the rear side frame in the vehicle width direction; and a wheelhouse gusset, in which the wheelhouse and the rear side frame are connected, wherein the wheelhouse gusset is connected to a third connection part provided on an upper surface of the rear side frame, and the reinforcing member is provided in a position side by side with the third connection part in an up-down direction within the section of the rear side frame.

3. The rear part structure of a vehicle body according to claim 1, further comprising:

a first partition member, provided in a position on a front side of the reinforcing member within the section of the rear side frame, wherein the first partition member is arranged in a position side by side with the first connection part in the vehicle width direction and is joined to the front cross member via the rear side frame.

4. The rear part structure of a vehicle body according to claim 1, wherein the arm attachment part has a convex part that becomes convex upward within the section of the rear side frame, and the reinforcing member extends in the vehicle width direction above the convex part and is joined to the rear side frame via a collar member on both sides of the convex part in the vehicle width direction.

5. The rear part structure of a vehicle body according to claim 4, wherein the collar member is joined to the reinforcing member by projection welding.

6. The rear part structure of a vehicle body according to claim 1, further comprising:

a side sill, arranged on the outside in the vehicle width direction with respect to the rear side frame and extending in the front-rear direction of the vehicle body, wherein at least a portion of an outer wall of the rear side frame in the vehicle width direction is formed by the side sill, and the reinforcing member has an outer end in the vehicle width direction joined to the side sill and an upper end joined to an upper wall of the rear side frame.

7. The rear part structure of a vehicle body according to claim 2, wherein at least a portion of an outer wall of the rear side frame in the vehicle width direction is formed by a curved part that is a portion of the wheelhouse, the rear part structure of a vehicle body comprises a second partition member provided in a position on a rear side of the reinforcing member within the section of the rear side frame, and the second partition member extends from the curved part to be inclined to a front side of the vehicle body and inward in the vehicle width direction, and has an inner end in the vehicle width direction joined to the reinforcing member.

8. The rear part structure of a vehicle body according to claim 7, further comprising:

an intermediate member, joined (adhered) to the reinforcing member and an upper side of the second partition member within the section of the rear side frame, wherein the intermediate member and the wheelhouse gusset are arranged in positions side by side in an up-down direction.

9. The rear part structure of a vehicle body according to claim 1, wherein the rear side frame has a portion on a rear side of the reinforcing member inclined toward the rear cross member on an inner side in the vehicle width direction, and the rear cross member is connected to a wheelhouse.

* * * * *